March 22, 1966  G. C. NEWTON, JR  3,241,377
METHOD OF AND APPARATUS FOR DETECTING ANGULAR MOTION
Filed Jan. 13, 1960  4 Sheets-Sheet 1

*INVENTOR.*
GEORGE C. NEWTON, JR.

BY *Rines and Rines*

*ATTORNEYS*

March 22, 1966 G. C. NEWTON, JR 3,241,377
METHOD OF AND APPARATUS FOR DETECTING ANGULAR MOTION
Filed Jan. 13, 1960 4 Sheets-Sheet 2

INVENTOR.
GEORGE C. NEWTON, JR.
BY Rines and Rines
ATTORNEYS

March 22, 1966   G. C. NEWTON, JR   3,241,377
METHOD OF AND APPARATUS FOR DETECTING ANGULAR MOTION
Filed Jan. 13, 1960   4 Sheets-Sheet 3

*INVENTOR.*
GEORGE C. NEWTON, JR.
BY *Rines and Rines*
ATTORNEYS

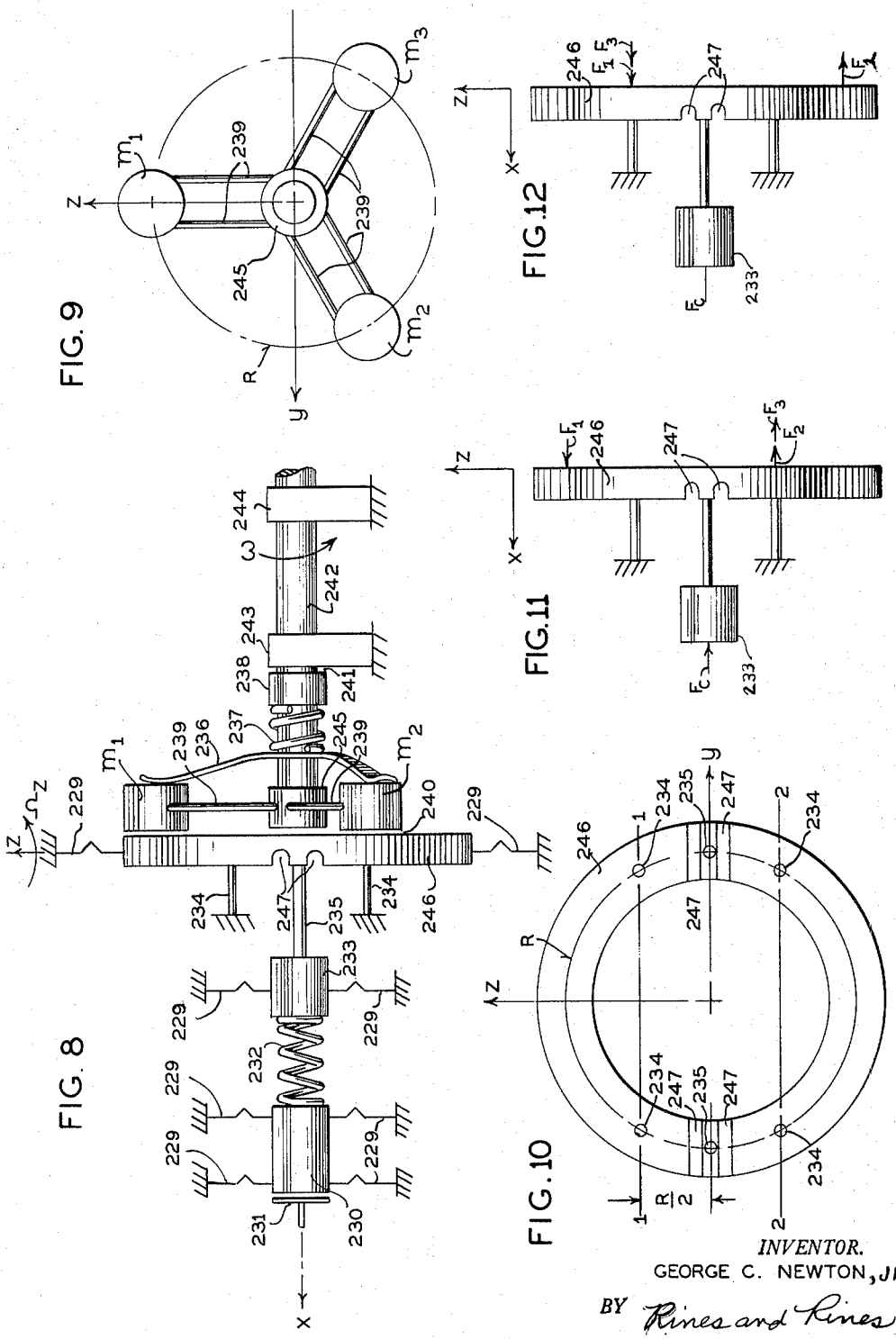

United States Patent Office 3,241,377
Patented Mar. 22, 1966

3,241,377
METHOD OF AND APPARATUS FOR DETECTING ANGULAR MOTION
George C. Newton, Jr., 21 Aberdeen Road, Wellesley, Mass.
Filed Jan. 13, 1960, Ser. No. 2,239
14 Claims. (Cl. 74—5.6)

The present invention relates to methods of and apparatus for detecting and measuring angular motion, and, more particularly, to angular-motion transducer apparatus.

Various types of instruments have been evolved for measuring angular motion with respect to inertial space. The gyroscope, as an illustration, measures such angular motion through the torque reaction resulting from its rotating wheel. Other types of angular motion-responsive apparatus have included vibrating rods or wires secured at one or both ends; sometimes, in the form of tuning forks and the like. Such forks, for example, have been mounted for free turning about a central axis extending parallel to the fork arms, being adapted to carry an angle indicator together with a means for vibrating the arms, whereby the arms may vibrate in a fixed plane even though the housing of the instrument be rotated.

Such prior-art angular-motion transducers, however, are subject to numerous disadvantages including, in the use of conventional gyroscopes, difficulty in distinguishing moments caused by angular motion from other constant moments due to unbalances in the presence of gravitation or acceleration fields. One approach to overcoming such difficulties is disclosed in my co-pending application, Serial No. 795,671, filed February 26, 1959, for Method of and Apparatus for Measuring Angular Motion, embodying the utilization of a pair of standing or traveling elastic waves, sonic or ultrasonic, in elastic-wave-supporting media of particular configuration; one set of elastic waves, termed the driving waves, imparting velocities to the mass elements that comprise the medium, and the second set of elastic waves, termed the sensing waves, detecting angular motion of the medium.

An object of the present invention, however, is to provide a novel angular-motion transducing method and apparatus of different character that overcomes such disadvantages and difficulties by employing measured moments or forces of an alternating character for constant angular rate of the reference frame of the transducer apparatus, and thus readily distinguishing from the constant forces or moments caused by gravity or acceleration.

It has long been known that a mass point, which is moving with respect to a set of coordinates, such as a reference frame, rotating with respect to inertial space, reacts upon the constraint determining its path with a force proportional to the cross product of its velocity in the reference frame and the angular velocity of the reference frame with respect to inertial space. This reaction force is known as the Coriolis force. All gyroscopic phenomena can be explained in terms of this force. In order to exploit the Coriolis force as a means for measuring angular motion in a practical instrument, it is necessary that the mass particle or particles move in bounded paths. If the path of a particle is to be bounded, it is necessary that its velocity change with time either in direction, or magnitude, or both. The Coriolis force developed by the particle also changes with the time even if the angular motion of the reference frame in inertial space remains constant.

A further object of the present invention, accordingly, is to provide a new and improved angular motion transducer that exploits the changing Coriolis force by allowing it to produce a vibration or vibratory force or moment which can be measured; such measurement indirectly determining the angular motion of the reference frame in space.

Other and further objects will be explained hereinafter and will be more particularly pointed out in connection with the appended claims.

The invention will now be described in connection with the accompanying drawing:

FIG. 1 of which is a combined longitudinal section of a tuning-fork-like embodiment and schematic circuit diagram of the invention, as applied to a straight-line mass motion configuration;

FIG. 8 is a side elevation of a further modification;

FIGS. 9 and 10 are opposite end views of a portion of the structure of FIG. 8; and FIGS. 11 and 12 are force diagrams illustrating the forces acting on the structure of FIG. 8.

Figure 1:
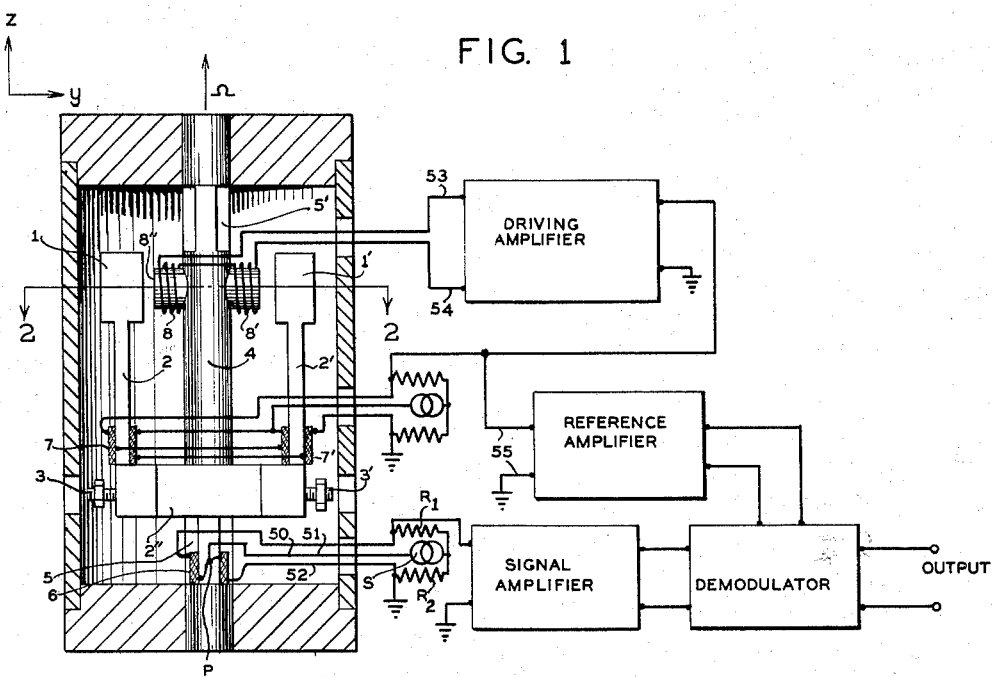

Referring to FIG. 1, a simple apparatus embodying the principles of the present invention is illustrated, comprising a tuning-fork-like structure 2, 2' supported by a base 2'' and employing terminal masses 1, 1' moving in straight-line sinusoidal motion. If the structure 2, 2' is rotated with angular rate $\Omega$ about the z-axis, Coriolis forces will be developed on the masses 1, 1' in the x-direction, out of the sheet of the drawing. Because the x-forces act on the tine arms 2, 2' about the z-axis, which vary with the y-distance of the masses 1, 1', a double frequency moment (second harmonic) is generated about the z-axis. It may be shown that the torque M acting on the fork about the z-axis is given substantially by the relationship, $$M = 2m\Omega \omega r_1 (2r_0 \cos \omega t + r_1 \sin 2\omega t)$$

where $m$ is the mass 1 or 1', $r_0$ is the average radius of the vibrating tuning-fork tines 2, 2', $r_1$ is the amplitude of the excursion of the mass 1 or 1' relative to the average position, and $\omega$ is the fork vibrating frequency. The torque thus comprises a fundamental term and a second harmonic term. Although the second harmonic term is smaller in amplitude than the fundamental term, because $r_1$ is generally smaller than $r_0$ and also because of the smaller numerical constant, this term may be easier to detect than the fundamental term because of cross coupling forces at fundamental frequency between the vibration of the fork and moments about the z-axis.

In order to enhance the response of the tuning-fork instrument to angular rates about the z-axis, it is possible to tune the fork 2, 2' and its shaft 4 so that it has a natural period about the z-axis equal to twice the frequency of oscillation of the fork. This can be done by elastically mounting the shaft 4 by means of spring sections 5 and 5'. It can be seen that the shaft 4 is relatively stiff in the x- and y-directions but is relatively elastic for rotation about the z-axis. Final adjustment of the period of the tuning fork 2, 2' in rotation is achieved by the tuning nuts 3 and 3' which give a fine adjustment of the mean moment of inertia of the fork about the z-axis.

As shown in FIG. 1, the angular motion of the tuning fork 2, 2' resulting from the angular rate about the z-axis is detected by strain gages, as of any conventional strain-gage bridge type, disposed at the base of the spring section 5. The strain-gage bridge is shown energized from an A.C. source $s$, one terminal of which connects by conductor 50 to an intermediate point P of the sensing elements 6, which, in turn, are connected by conductors 51 and 52 and through respective resistors $R_1$ and $R_2$ to the other terminal of the source $s$. The output of the strain-gage bridge 6 is amplified in the Signal Amplifier, and, if a D.-C. output is desired, demodulated in a Demodulator to produce a final output signal at the terminals labelled Output.

Figure 2:
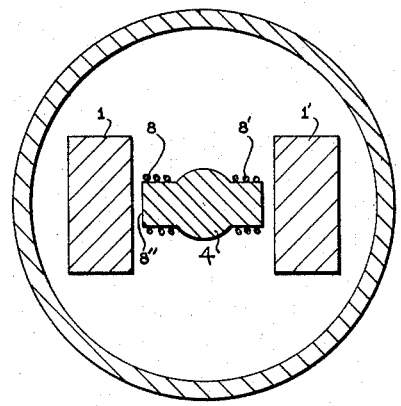
FIG. 2 is a transverse section taken along the line 2—2 of FIG. 1, looking in the direction of the arrows.

In order to maintain the fork 2, 2' in a state of vibration, a magnetic driving means may be used. Coils 8 and 8' are shown in FIGS. 1 and 2, wound on a magnetic core 8" attached to the shaft 4, the magnetic core 8" carrying a permanent magnetic bias. By supplying the coils 8, 8' with alternating current at the natural frequency of the fork 2, 2', the fork may be made to oscillate. The necessary alternating signal for exciting the coils 8, 8' may be derived from strain-gage elements 7 and 7' similar to the strain gages 6, and located on the respective tines 2 and 2'. Amplification of the strain-gage signal developed at 7 and 7' is effected by a Driving Amplifier, the output conductors 53 and 54 of which provide the necessary coil currents for the coils 8, 8'. Means for stabilizing the amplitude of vibration, not shown, may be incorporated in the driving amplifier, as is conventional. The strain gages 7, 7' on the tines 2 and 2' may also feed a Reference Amplifier, by conductors 55, to provide a reference signal for operating the before-mentioned phase-sensitive Demodulator.

In order to make the tuning fork instrument of FIGS. 1 and 2 operate satisfactorily, it is necessary that the fork 2, 2' be stiff enough to transmit the $x$-forces developed on the masses 1, 1' to the base 2" of the fork and then through the base 2" to the shaft 4. The tines 2, 2' of the fork, on the other hand, must be flexible enough to allow the masses 1, 1' to vibrate in the $y$-direction. These requirements are accomplished by making the tines 2, 2' of the fork thin in the elevation view of FIG. 1 and thick or wide on the side.

The tuning fork configuration for transducing rotation into vibration has the advantage of simplicity of the mechanical moving parts and is useful in some applications. It suffers, however, from certain disadvantages particularly in applications requiring high sensitivity. The major factor contributing to the relatively low sensitivity is the low velocity of the masses 1, 1'. Although the effect of this low velocity can be offset to a degree by making the fork suspension about the $z$-axis highly resonant at the second harmonic of the fork vibration frequency, it is still desirable to increase the velocity of the masses in order to achieve maximum sensitivity.

Figure 3:
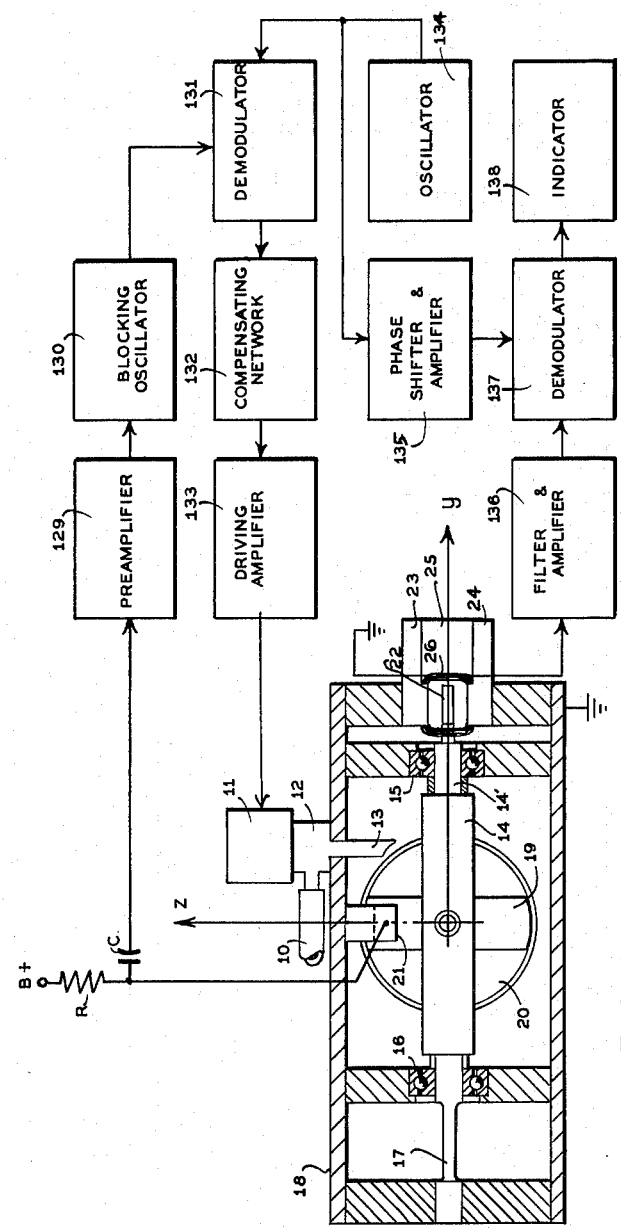
FIG. 3 is a view similar to FIG. 1 of a preferred modification embodying an asymmetrical rotor.

A more sensitive angular motion transducer apparatus is accordingly shown in FIG. 3, involving an asymmetrical rotor arrangement for converting rotation into vibration. The rotor comprises a turbine wheel 20 and a gimbal 14, FIGS. 3 and 4, on which are affixed two bars 19 and 19'.

Figure 4:
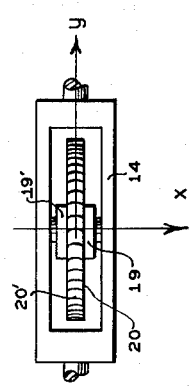

To understand the operation of this device, consider an instrument coordinate system, fixed with respect to the instrument housing 18, and having its origin at the center of the rotor, with the $z$-axis extending vertically in FIG. 3, the $y$-axis coinciding with the axis of the rotor gimbal 14, as shown in FIGS. 3 and 4, and the $x$-axis coinciding with the rotor axis when the gimbal 14 is in its neutral position.

Figure 5:
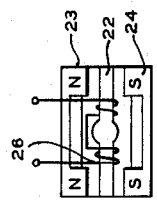
FIGS. 4 and 5 are fragmentary top and side elevations of the rotor assembly.

Assuming, for example, that the rotor 20 is revolving about its axis with an angular velocity $\omega/2$, and that the angle of the rotor is zero when a particle near the end of one of the bars 19, 19', lies in the $x$–$z$ plane, with the rotor axis coinciding with the $x$-axis, then the $y$-component of the velocity of the particle will vary co-sinusoidally with rotor angle. If the instrument rotates with respect to inertial space with an angular velocity $\Omega$ pointing along the $z$-axis, the particle will be subject to a Coriolis force which is parallel to the $x$-axis and which varies co-sinusoidally with rotor angle. The moment arm of this force with respect to the $y$-axis is equal to the value of its $z$-coordinate. But the $z$-coordinate of the particle also varies co-sinusoidally with rotor angle. The moment of the Coriolis force about the $y$-axis thus varies as the square of the cosine of the rotor angle. This means that the moment will have an average value and a double-frequency component. It is this alternating component, of frequency twice that of the rotor spin frequency, that is detected in the instrument of FIGS. 3 to 5.

The illustrated technique for detecting the alternating component of the moment of the Coriolis forces acting on the particles of the bars 19 and 19' involves suspending the gimbal 14 which supports the rotor 20 in bearings 15 and 16, FIG. 3. If desired, flexure pivots may be employed in place of ball bearings at these points in order to eliminate friction effects. Flexure pivots can be used because gimbal deflections will never be very large in instruments of this type. By restraining the gimbal 14 by means of a torsion bar 17 coupling it to the housing 18, and by adjusting the natural frequency of the gimbal-torsion bar system to be equal to twice the rotor spin frequency, the gimbal 14 can be caused to tilt in response to the moments of the Coriolis forces. The amplitude of the alternating tilt angle of the gimbal 14 is magnified by making the natural frequency of its suspension agree with the frequency of the moments of the Coriolis forces. The alternating tilt angle of the rotor 20 is detected by means of an electromagnetic pickup 26 mounted on the end of the instrument opposite to the torsion bar 17. The electromagnetic pickup comprises pick-up coils 26 surrounding an armature 22 fixed to the gimbal shaft 14' operating between pole pieces 23 and 24, as more particularly shown in FIGS. 3 and 5. A permanent magnet block 25 causes magnetic flux to pass through the armature 22, with the amount of such flux being a function of the tilt angle of the armature. The coils 26, in response to the alternating tilt of the armature 22, will therefore have an alternating voltage induced in them as a result of the changing flux.

In order to maintain the rotor spin frequency at a constant value, a suitable drive must be provided to overcome the friction torque, and this drive must be properly controlled to maintain the speed constant. An electric-motor drive could be used; but, in FIG. 3, an air turbine drive, which has been successfully used for reasons of experimental convenience, is illustrated. Low pressure air (of, for example, the order of 3 pounds per square inch above atmospheric pressure) may be supplied through a tube 10 to a control valve 12. From the control valve 12 the air passes through a nozzle 13 where it impinges on the buckets 20' of the rotor 20. A torque motor or solenoid 11 is used to control the opening of the valve 12 in conventional fashion.

Speed control is achieved with the aid of a series of pulses the frequency of which is twice the spin frequency of the rotor 20. As shown in FIG. 3, these pulses are generated by operating upon changes of voltage across the capacitor formed by a stationary plate 21 and the rotor 20. The capacity is large when the end of bar 19 passes by the stationary plate 21; and the capacity is much lower in the interval between the passage of the bar ends. By connecting the capacitor plate 21 to a high voltage supply B+ through a large resistance R, the changes in capacity value can be converted to changes in voltage. This voltage is fed through a coupling capacitor C and amplified by a preamplifier 129 which is then used to trigger a blocking or other oscillator 130. The pulses resulting from the blocking oscillator 130 are used as a reference for a demodulator 131 that is supplied with a signal from a sine-wave oscillator 134, the frequency of which serves as the rotor speed reference. The output of the demodulator 131 passes through a compensating network 132 used to give stability to the speed control system and then is amplified at 133 in order to drive the torque motor or solenoid 11 of the control valve 12.

This closed-loop speed-control system operates as follows. The pulses from the blocking oscillator 130 are approximately in phase with the passage of the bar 19 underneath the fixed capacitor plate 21. Normally, the blocking oscillator pulse will open the gate of the demodulator 131 at a zero crossing of the sine-wave voltage from the oscillator 134. There is, accordingly, essentially no signal supplied to the torque motor 11 and the control valve 12 remains in its neutral position, which is partway open. If, however, the rotor 20 should run slow so that the blocking oscillator pulse arrives late, the demodulator 131 will generate a voltage tending to open the control valve 12. This will cause more air to flow and the rotor 20 to speed up. If the rotor should go too fast it is evident that the demodulator voltage will reverse and cause the valve to close off. In this way, synchronization of the rotor phase with the oscillator phase is achieved and the rotor speed can be controlled to the same accuracy as the oscillator frequency.

The output signal from the pickup of the asymmetrical rotor transducer of FIG. 3 may be used as a measure of angular rate in a plane perpendicular to the x-axis. In order to provide high sensitivity, it may be desirable to amplify this signal. In FIG. 3, therefore, the signal is passed from the coils 26 through an amplifier and filter system 136 and is fed to a further demodulator 137 which is supplied with a reference voltage derived from the reference oscillator 134 through a phase shifter and amplifier 135. The output of the demodulator 137 can then be used to actuate an indicator or other device 138. The arrangement of signal processing shown in FIG. 3 has been found to be most satisfactory in experimental tests of the asymmetrical rotor principle of FIG. 3.

An experimental apparatus of the type shown in FIG. 3, embodying a rotor 20 about 5.56 centimeters in diameter having asymmetrical moments of inertia around its three axes of $I_1 = 701$ gm./cm.$^2$, $I_2 = 472$ gm./cm.$^2$ and $I_3 = 290$ gm./cm.$^2$ was successfully operated for rate-measuring and platform stabilization purposes with the following characteristics:

| | |
|---|---|
| Rotor speed | 45.12 revolutions per second. |
| Gimbal 14 natural frequency | 90.24 cycles per second. |
| Sensitivity at output indicator (unmodulated signal) | 3330 volts sec. rad.$^{-1}$. |
| R.M.S. noise level at output indicator | 0.2 volt. |
| Noise equivalent R.M.S. rate (referred to input) | $0.60 \times 10^{-4}$ rad. sec.$^{-1}$. |
| Sensitivity at pickup coil 26 output | 14 volts (peak) sec. rad.$^{-1}$ suppressed carrier signal. |
| Q of gimbal suspension | 117. |
| Bias signal at pickup coil 26 output | 0.015 volt peak. |
| Bias signal equivalent rate referred to input | $1.07 \times 10^{-3}$ rad. sec.$^{-1}$. |

The principal advantage of the asymmetrical rotor transducer of FIG. 3 over the tuning fork transducer of FIG. 1 resides in the relatively high velocity of particles that can be achieved in the spinning rotor 20. This is in distinct contrast to the low velocity that is achieved in the masses 1, 1' located at the ends of the tines 2, 2' of a tuning fork. Relative to conventional gyroscopes, the asymmetrical rotor of FIG. 3 enjoys the further advantage of having an output signal which is at a frequency of twice the rotor spin frequency. This means that the output signal is not easily confused with the unmodulated moments due to mass unbalance in the presence of gravitational and acceleration fields. Furthermore, the output signal is at a frequency which is different than the pulsating moments due to dynamic unbalance of the rotor. As a result of these advantages, the rotor bearing problem is considerably relieved. Ample lubrication can be provided without danger of errors introduced by lubricant drift. Because adequate lubrication can be provided, moreover, high rotor speeds can be used if this is desirable. In general, the spin axis bearing problem of the asymmetrical rotor instrument of FIG. 3 is considerably different from the spin axis bearing problem of the conventional gyroscope. The bearing requirement for the asymmetrical rotor instrument is primarily one of providing elastic contact, and this can be achieved through the use of sufficiently large bearings. There is no problem of supplying the necessary power to the rotor. The changed and relaxed requirements on the bearings is thus another important advantage over conventional present-day gyroscopes.

Figure 7:
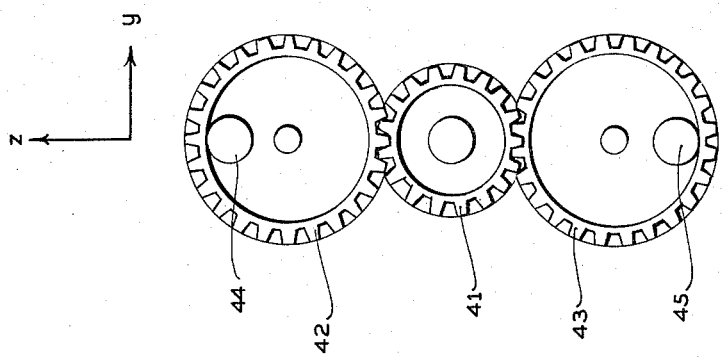
FIG. 7 is a side elevation of the gear details of the embodiment of FIG. 6.
Figure 6:
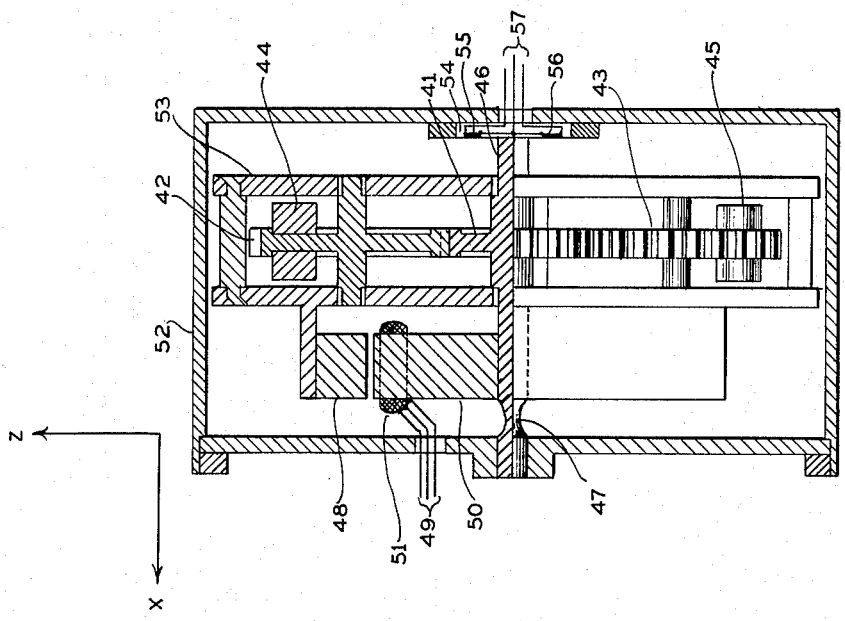
FIG. 6 is a partial longitudinal section of still a further modification adapted for generating epitrochoidal motion.

As a further example of the versatility of the techniques underlying the present invention, reference is made to the embodiment of FIGS. 6 and 7 involving rotation-to-vibration transduction capable of generating more complex trajectories for the mass particles than were possible with the two previous configurations of FIGS. 1 and 3. In FIG. 6, a planetary gear embodiment for generating epitrochoidal motion is illustrated. The parts inside the housing 52 are shown in quarter-section elevation view. A small sun gear 41, FIGS. 6 and 7, is affixed to a stationary shaft 46. A cage 53 revolves around a fixed central shaft 46 and carries with it planetary gears 42 and 43. The planetary gears 42, 43 carry respective masses 44, 45. The masses 44, 45 are in their extreme positions in FIG. 6, along an extended diameter of the stationary circle formed by the sun gear 41. As the cage 53 revolves, the gearing arrangement causes the particles making up the masses 44 and 45 to describe epitrochoidal paths around the center shaft 46. It has been found that the Coriolis forces developed on the particles making up the masses 44 and 45 develop moments about the y-axis of the instrument whenever there is an angular rate of the instrument with respect to inertial space which lies in the y–z plane. The x-axis lies parallel to the central shaft 46 and the other two axes lie in a plane perpendicular to this shaft; these axis directions being indicated in FIGS. 6 and 7. In general, the moment of the Coriolis forces about the y-axis contains a number of components of different frequencies. These frequencies, moreover, are not generally harmonically related to the rotation frequency of the cage 53. Frequencies above and below the cage rotation frequency have been found to exist.

In order to detect the pulsating moment of the Coriolis forces, and therefore the angular rate of the instrument, a means for measuring the moment must be provided. The shaft 46 is notched at location 47 in order to provide the ability to flex and thereby give the planetary gear train a degree of freedom around the y-axis. However, this freedom to twist around the y-axis is eliminated by a taut metal ribbon 54 shown in edge view in FIG. 6. This ribbon 54 ties the shaft 46 to the housing 52. Located on the ribbon 54 are strain gages 55 and 56 which can be used to form two arms of a bridge by connecting the leads 57 to appropriate conventional circuitry before discussed in connection with the embodiment of FIG. 1. In this way, the moment of the Coriolis forces is converted to an electrical output output signal which, in general, contains the same frequency components as the moment itself. By means of suitable filters, unwanted frequency components can be rejected and the instrument is thereby made sensitive to the desired frequency component.

In order to drive the cage 53, a synchronous motor may be provided comprising a hysteresis ring 48 attached to the cage 53 and driven by a standard stator 50 attached to the shaft 46. Current is brought into the stator coils 51 by means of leads 49. Because a hysteresis-type synchronous motor will not synchronize at a definite angle of the cage with respect to the phase of the excitation of the motor, a system, as discussed in connection with the apparatus of FIGS. 1 and 3, for detecting the cage position may be used in order to develop a signal for actuating the demodulators that will be used at the output signals from the strain gages 55 and 56.

A planetary gear embodiment for realizing this epitrochoidal motion, FIG. 7, will result in slightly non-uniform angular velocity for the cage 53. This non-uniform angular velocity will result from unbalanced centrifugal forces associated with the rotation of masses 44 and 45. Although these centrifugal forces will be balanced in a radial direction, they will be unbalanced in a tangential direction referred to the circle described by the centers of the planetary gears 42, 43. This unbalance of the centrifugal forces will result in a torque tending to speed up or slow down the cage. Due to the inertia of the cage parts, the variations in angular velocity resulting from this torque will be small and therefore there is relatively little effect on the Coriolis forces and resulting moment.

The planetary gear arrangement of FIGS. 6 and 7 represents one method for developing a more complex trajectory for a mass particle. It is evident that many other schemes can be devised which would be capable of doing substantially the same thing. For example, it is not necessary to employ planetary gears. One may drive the wheels carrying the masses 44 and 45 by means of small motors carried by the cage 53. These motors could be arranged to have speeds bearing the desired ratio relative to the speed of the cage driving motor.

In summary, therefore, three possible and radically different apparatus configurations have been illustrated in FIGS. 1, 3 and 6, for the practical realization of the method underlying the present invention for converting rotation into vibration. The simplest of these configurations, FIG. 1, employs a tuning fork in order to achieve approximately straight-line sinusoidal motion of masses located at the ends of the tines. An asymmetrical rotor configuration is shown in FIG. 3 in which mass particles move at constant speeds in circular orbits; and a more complex device is illustrated in FIG. 6 in which the mass particles move in relatively complex trajectories with neither the speed nor direction constant. In all three embodiments, the trajectories of the mass particles are bounded with respect to the instrument reference frame. There are obviously many other kinds of open and closed curve trajectories for mass points which represent bounded curves and which result in a large variety of frequency terms in the expressions of the moment of the Coriolis force. In the same class as the epicycloid are the hypocycloid, the hypotrochoid, and the epitrochoid. Analysis of these will show that one can generate frequency terms in the moment expression of almost any desired ratio relative to the frequency of rotation of the generating circles. It is therefore evident that, in accordance with the method of the present invention, the designer of a transducer for converting rotation into vibration may select any of a large number of possibilities, all within the scope of the invention.

The versatility of the present invention is further demonstrated by the entirely different apparatus of FIGS. 8 to 10, in which the rotor is provided with three active masses $m_1$, $m_2$, and $m_3$. As shown in FIG. 9, the masses are equally spaced at a radius R and are supported by tubes 239 which are connected to a central hub 245 that, in turn, is fastened to a shaft 242. The masses of the rotor slide along a pressure ring 246, that is elastically mounted to the main instrument frame by means of supports 229 and support rods 234. As a consequence of these supports, the ring does not rotate. The masses $m_1$, $m_2$, and $m_3$ are spring loaded against the pressure ring 246 by means of spider 236, pressed in the positive x-direction by means of spring 237, which is held in place by collar 238.

This collar 238 also forms a thrust surface 241 against bearing 243. This thrust surface takes the reaction force of the spring loading. Shaft 242 is turned by conventional motive means, not shown, at angular velocity $\omega$. The other end of this shaft is supported by bearing 244. The thrust surfaces underneath the masses, as, for example, that indicated by 240 for mass $m_2$, may be lubricated by a gas film or by an oil film. The lubricant may be carried to these surfaces through a hollow shaft and through the tubes 239 connecting the masses to the hub. These tubes 239 are sufficiently flexible so that the spring 237 can maintain good contact of the masses against the pressure ring 246. The same kind of lubrication may be used for bearings 243 and 244, as well as the thrust bearing 241.

The pressure ring 246 is arranged to bend slightly along a diameter parallel to the y-axis. This freedom to bend is accomplished by notching the back side of the ring in four locations 247, as shown in FIG. 10. The upper and lower halves of the pressure ring 246 are arranged to hinge on chord lines 1—1 and 2—2, respectively. The four support rods 234 are sufficiently slender to act as hinges. The two drive rods 235 connect the y-axis diameter locations on the ring to a beam 233 which is shown in end view in FIG. 8. This beam is supported elastically by flexible members 229. At the center of the beam, with its axis coincident with the x-axis of the apparatus, is located spring 232 which connects the beam to cylindrical mass 230 acting as a counterpoise and also as one element of a pickup of the capacitor type. The other element of the pickup is shown as disc 231. The counterpoise mass 230 is preferably smaller than the effective mass of the rotor, pressure ring 246, and the beam 233. The counterpoise mass 230 is elastically supported with respect to the instrument frame by supports 229. In operation, the angular velocity $\omega$ of shaft 242 is made to be nearly equal to one-third of the natural frequency associated with spring 232, the counterpoise mass 230, and the effective mass at the other end of the spring associated with beam 233, that corresponds to opposed motion of the ends of spring 232.

Let it be assumed that the apparatus as a whole is being revolved around the z-axis with an angular rate $\Omega_z$ and that there are no other components to the angular rate. Then the Coriolis force associated with mass $m_1$ is in the positive x-direction and is shown as the force $F_1$ in FIG. 11. This force is located at a distance R above the y-axis diameter of the ring. The Coriolis forces associated with masses $m_2$ and $m_3$ will be one half as great in magnitude as $F_1$ because the component of their velocity parallel to the y-axis is precisely one half as great as that of mass $m_1$. Furthermore, these forces are located a distance $R/2$ below the y-axis diameter of the pressure ring 246. Thus these forces lie right above the supports 234 associated with line 2—2 of FIG. 10. In view of the way the ring is supported and in view of its degree of freedom in bending around the y-axis diameter, the net effect of the Coriolis force F is to produce a force $F_c$ at the center of beam 233 which tends to pull the end of spring 232 to which the beam is attached in the negative x-direction.

In FIG. 12, there is shown the Coriolis forces for the condition where the shaft 242 has rotated 60 degrees beyond that indicated in FIG. 8. The Coriolis force associated with mass $m_2$ is at its maximum value in the negative x-direction and is located a distance R below the y-axis diameter of the ring. The forces on the other two masses are pointing in the positive x-direction and are one half as large in magnitude. They are located at a distance $R/2$ above the y-axis diameter of the ring. The net effect of the forces shown in FIG. 12 is to produce a force $F_c$ tending to drive the end of spring 232 in the positive x-direction. From FIGS. 11 and 12 it is thus evident that the 60-degree movement of the rotor has caused the resultant force $F_c$ to change from a maximum negative value to a maximum positive value. The amplitude of the force $F_c$, moreover, is equal to the amplitude of the Coriolis forces associated with any one of the masses. This type of analysis for other shaft position shows that the resultant force $F_c$ alternates at a frequency equal to three times the shaft rotation frequency $\omega$. The wave form of this force is not exactly sinusoidal but contains odd harmonics; but the amplitude of its third harmonic (9 times the shaft rotation frequency) is of the order of one quarter of that of the fundamental.

Any convenient means may be employed for sensing the resultant force $F_c$. The means shown in FIG. 8 uses a counterpoise mass 230, small compared to the effective mass at the other end of spring 232, so that its amplitude of motion is large compared to the motion in the $x$-direction of beam 233. As a consequence, the bending of the pressure ring 246 can be minimized. By minimizing losses so that a high Q is obtained, a large amplitude of response of counterpoise 230 is obtained for small amplitude of force $F_c$. Since the Coriolis forces giving rise to the resultant force $F_c$ are proportional to the angular rate $\Omega_z$, the amplitude of motion of counterpoise mass 230 tends to be proportional to the same angular rate. Its motion can be converted to electrical signals by means of any convenient transducer such as the capacity-type of pickup formed by one face of counterpoise mass 230 and the electrode 231.

It is possible to choose the system parameters so that the operating natural frequency is nine times the shaft rotation frequency. The counterpoise mass will then respond to the third harmonic of the resultant force $F_c$. Even though the third harmonic is lower in amplitude than the fundamental, there may be advantages in so adjusting the system that it responds to this component, as, for example, if there were an adverse bearing noise condition at three times the shaft frequency but no similar condition at nine times the shaft rotation frequency. Tuning the pickup means to nine times the shaft rotation frequency would thus improve the signal-to-noise ratio.

It is essential, moreover, to the attainment of the highest performance, that the precision of the speed control for the rotor be maintained, as by the feedback system of FIG. 3, to better than approxmiately 0.1%, as otherwise the frequency of the moments of the Coriolis forces will not agree with sufficient precision with the natural frequency of the detecting system.

The concept of a counterpoise mass as used for vibratory force detection in the embodiment shown in FIG. 8 can also be used to advantage in the instruments of FIGS. 1, 3 and 6. For example, as applied to FIG. 3, a rotational counterpoise may be used. By coupling the armature 22 to the gimbal shaft 14' by means of a torsion bar similar to torsion bar 17, it is possible, with suitably chosen parameter values, to make the amplitude of vibratory tilt of the armature 22 considerably larger than that of the gimbal 14. This arrangement makes possible a higher sensitivity at the output of the pickup since the Q of the counterpoise detection system can be made higher than that of the simpler system of FIG. 3.

Further modifications will occur to those skilled in the art and all such are considered to fall within the spirit and scope of the invention as defined in the appended claims.

What is claimed is:

1. Angular-motion detecting apparatus having, in combination, a rotor two of the moments of inertia of which about its principal axes are different, constraining means connected with the rotor, means for permitting angular motion of the rotor and its constraining means with respect to inertial space, the constraining means confining the movement of mass elements of the rotor to predetermined trajectories with respect to the constraining means at a predetermined frequency, whereby a Coriolis force is generated in response to the said angular motion, the connection of the said constraining means with the rotor being rigid at least in the direction of the detected Coriolis force to insure the substantial constancy of the said predetermined trajectories during angular motion of the rotor and its constraining means, and means disposed with respect to the rotor and constraining means and adapted to detect an alternating moment produced by such Coriolis force of frequency different from the said predetermined frequency.

2. Apparatus as claimed in claim 1 and in which the rotor comprises tuning-fork mass elements, and the constraining means comprises tuning-fork tine means.

3. Apparatus as claimed in claim 1 and in which the detecting means is tuned to be resonant to the said different frequency.

4. Apparatus as claimed in claim 3 and in which a counterpoise is resiliently connected to the said constraining means and is disposed to cooperate with the said detecting means to enable the resonant detection of the said different frequency.

5. Apparatus as claimed in claim 3 and in which the resonant detecting is at least in part attained by resilient coupling between the constraining means and the means for permitting angular motion of the rotor and its constraining means with respect to inertial space.

6. Apparatus as claimed in claim 1 and in which the constraining means confines the said rotor trajectory to one of the family of trochoidal curves.

7. Apparatus as claimed in claim 1 and in which the said different frequency is twice the predetermined frequency.

8. Apparatus as claimed in claim 1 and in which the mass of the rotor cooperates with the said constraining means to generate Coriolis force moments at frequencies other than the predetermined frequency and double the same, and in which the means disposed to detect such moments receives at least one of such other frequencies.

9. Apparatus as claimed in claim 8 and in which the rotor comprises a plurality of space-distributed masses.

10. Apparatus as claimed in claim 9 and in which flexible pressure means is provided contacting the rotor masses and serving as part of the said constraining means therefor and part of the means disposed to detect the Coriolis force moments applied to the pressure means by the rotor.

11. Angular-motion detecting apparatus, having, in combination, a rotor two of the moments of inertia of which about its principal axes are different, constraining means connected with the rotor, means for permitting angular motion of the rotor and its constraining means with respect to inertial space, the constraining means confining the movement of the rotor to a predetermined trajectory at a predetermined frequency, whereby a Coriolis force is generated in response to the said angular motion, and means disposed with respect to the rotor and constraining means and adapted to detect an alternating moment produced by such Coriolis force of frequency different from the said predetermined frequency, the said constraining means including a bearing-containing gimbal and an axle supported by the bearings and constrained from relative displacement with respect to the gimbal, and moment-detecting means being disposed to sense movements of the said gimbal.

12. Apparatus as claimed in claim 11 and in which the detecting means is tuned to be resonant to the said different frequency.

13. Apparatus as claimed in claim 12 and in which a counterpoise is resiliently connected to the said constraining means and is disposed to cooperate with the said detecting means to enable the resonant detection of the said different frequency.

14. Apparatus as claimed in claim 11 and in which the mass of the rotor cooperates with the said constraining means to generate Coriolis force moments at frequencies other than the predetermined frequency and double the same, and in which the detecting means receives at least one of such other frequencies.

(References on following page)

References Cited by the Examiner

UNITED STATES PATENTS

| | | | |
|---|---|---|---|
| 1,267,886 | 5/1918 | Malysheff | 74—61 |
| 1,801,619 | 4/1931 | Arrea | 74—5 X |
| 2,544,646 | 3/1951 | Barnaby et al. | 73—505 |
| 2,605,093 | 7/1952 | Dorand | 73—516 |
| 2,627,400 | 2/1953 | Lyman et al. | 73—505 |
| 2,716,893 | 9/1955 | Birdsall | 310—8.4 X |
| 2,725,750 | 12/1955 | Togstad | 74—5.6 |
| 2,753,173 | 7/1956 | Barnaby et al. | 73—505 |
| 2,969,681 | 1/1961 | Beasely | 74—5.4 |
| 2,991,659 | 7/1961 | Bowden | 74—56 |

BROUGHTON G. DURHAM, *Primary Examiner.*

SAMUEL LEVINE, *Examiner.*